(12) United States Patent
Yang (10) Patent No.: US 11,706,140 B2
(45) Date of Patent: Jul. 18, 2023

(54) PACKET FORWARDING METHOD AND NETWORK DEVICE

(71) Applicant: HUAWEI TECHNOLOGIES CO., LTD., Shenzhen (CN)

(72) Inventor: Jie Yang, Nanjing (CN)

(73) Assignee: HUAWEI TECHNOLOGIES CO., LTD, Shenzhen (CN)

( * ) Notice: Subject to any disclaimer, the term of this patent is extended or adjusted under 35 U.S.C. 154(b) by 0 days.

(21) Appl. No.: 17/232,431

(22) Filed: Apr. 16, 2021

(65) Prior Publication Data

US 2021/0328922 A1    Oct. 21, 2021

(30) Foreign Application Priority Data

Apr. 20, 2020 (CN) .................... 202010314463.0

(51) Int. Cl.
| | |
|---|---|
| *H04L 45/745* | (2022.01) |
| *H04L 12/46* | (2006.01) |
| *H04L 45/64* | (2022.01) |
| *H04L 45/586* | (2022.01) |

(52) U.S. Cl.
CPC ........ *H04L 45/745* (2013.01); *H04L 12/4633* (2013.01); *H04L 12/4641* (2013.01); *H04L 45/586* (2013.01); *H04L 45/64* (2013.01)

(58) Field of Classification Search
None
See application file for complete search history.

(56) References Cited

U.S. PATENT DOCUMENTS 7,792,021 B1* 9/2010 Pankajakshan ......... H04L 45/02
                                                  370/254
2010/0027549 A1 2/2010 Satterlee et al.
(Continued)

FOREIGN PATENT DOCUMENTS

| EP | 3 270 546 A1 | 1/2018 |
| WO | 2016/077060 A1 | 5/2016 |

OTHER PUBLICATIONS

M. Mahalingam, D. Dutt, K. Duda, P. Agarwal, L. Kreeger, T. Sridhar, M. Bursell and C. Wright, Virtual eXtensible Local Area Network (VXLAN): A Framework for Overlaying Virtualized Layer 2 Networks over Layer 3 Networks, RFC 7348, pp. 1-22 (Year: 2014).*

(Continued)

*Primary Examiner* — Christopher M Crutchfield
(74) *Attorney, Agent, or Firm* — Maier & Maier, PLLC (57) ABSTRACT

A packet forwarding method and a network device are provided, and the method is applied to the network device. The network device includes a first virtual routing and forwarding (VRF) table and a second VRF table. The method includes: the network device receives a first packet. If the first packet carries tunnel attribute information, the network device forwards the first packet based on the first VRF table. The first VRF table includes one or more local routes, and next-hop outbound interfaces of the one or more local routes are all local outbound interfaces. The network device forwards the first packet based on the first VRF table, so that a packet from a tunnel may be forwarded to a local virtual machine for processing and may not be forwarded to another tunnel endpoint device, to avoid a routing loop during packet forwarding.

14 Claims, 9 Drawing Sheets

(56) References Cited

U.S. PATENT DOCUMENTS

| | | | |
|---|---|---|---|
| 2012/0207018 A1* | 8/2012 | Goldenberg | H04L 12/462 370/230 |
| 2012/0236860 A1* | 9/2012 | Kompella | H04L 45/28 370/392 |
| 2015/0309894 A1* | 10/2015 | Zhou | H04L 45/22 714/4.11 |
| 2016/0112307 A1* | 4/2016 | Shen | H04L 12/4641 370/254 |
| 2016/0164782 A1* | 6/2016 | Wang | H04L 45/38 370/235 |
| 2017/0339054 A1 | 11/2017 | Yadav et al. | |

OTHER PUBLICATIONS

D. Awduche, L. Berger, D. Gan, T. Li, V. Srinivasan and G. Swallow, RSVP-TE: Extensions to RSVP for LSP Tunnels, pp. 1-61 (Year: 2001).*

J. Rabadan, S. Sathappan, K. Nagara, J. Bueno and J. Crespo, Loop Protection in EVPN networks, pp. 1-15, Feb. 6 (Year: 2019).*

Rosen et al., BGP/MPLS IP VPNs, draft-ietf-l3vpn-rfc2547bis-03.txt, Network Working Group, Oct. 2004, 49 pages.

Mahalingam et al., Request for Comments: 7348, Virtual eXtensible Local Area Network (VXLAN): A Framework for Overlaying Virtualized Layer 2 Networks over Layer 3 Networks, Independent Submission, Aug. 2014, 22 pages.

* cited by examiner

PACKET FORWARDING METHOD AND NETWORK DEVICE

CROSS-REFERENCE TO RELATED APPLICATION

This application claims priority to Chinese Patent Application No. 202010314463.0, filed on Apr. 20, 2020, which is hereby incorporated by reference in its entirety.

TECHNICAL FIELD

The embodiments relate to the field of communications technologies, and in particular, to a packet forwarding method and a network device.

BACKGROUND

With rapid development of cloud computing, a data center is becoming increasingly virtualized. To meet an increasing user requirement, the data center usually uses a virtual extensible local area network (VXLAN) technology to extend network virtualization, to obtain a sufficient quantity of virtual networks, so as to meet a use requirement of a user.

A VXLAN of the data center usually includes a core device, a plurality of peer VXLAN tunnel endpoint (VTEP) devices, and virtual machines (VM) separately connected to the VTEP devices. Generally, the VM may be deployed on a server connected to the VTEP device. A virtual network function (VNF) network element may be distributed on a plurality of VMs, and the plurality of VMs can implement a same network function and share a same service internet (IP) address.

Currently, on a VXLAN network, when a plurality of VMs of a same VNF network element are connected to different VXLAN tunnel endpoint devices, a routing loop is likely to occur when the VXLAN tunnel endpoint devices each forward a packet. As a result, the packet cannot be correctly sent to the VM.

SUMMARY

Embodiments provide a packet forwarding method and a network device. When the network device receives a packet from a transmission tunnel (such as a packet forwarded by another tunnel endpoint device), the network device forwards the packet based on a virtual routing and forwarding (VRF) table including only a route whose next hop is a local outbound interface, to prevent the packet from being forwarded to the another tunnel endpoint device again. This avoids a routing loop and ensures normal packet forwarding.

A first aspect of the embodiments provides a packet forwarding method. The method is applied to a network device, and the network device includes a first VRF table and a second VRF table. The method includes: In a working process of the network device, after the network device receives a first packet, the network device determines whether the first packet carries tunnel attribute information. If the first packet carries the tunnel attribute information, it indicates that the first packet is transmitted by a network-side device to the network device through a tunnel. The network device may forward the first packet based on the first VRF table. The first VRF table includes one or more local routes, and next-hop outbound interfaces of the one or more local routes are all local outbound interfaces. In other words, when the network device forwards the first packet based on the first VRF table, it can be ensured that a route selected by the network device is a local route instead of a remote route.

In this embodiment, when the network device receives a packet carrying the tunnel attribute information, for example, when the packet is sent from a tunnel endpoint device on a network side to the network device, the network device forwards the packet based on a VRF table including only a local route, to prevent the packet from being forwarded to another tunnel endpoint device again. In other words, this avoids a routing loop and ensures normal packet forwarding.

Optionally, in a possible implementation, before the network receives the first packet, the method further includes: the network device generates the first VRF table based on a fact that an obtained route is a local route; or the network device determines a route whose next hop is a local outbound interface in the second VRF table, and generates the first VRF table based on the route whose next hop is the local outbound interface in the second VRF table. In other words, the network device may generate the first VRF table based on a local route in the second VRF table, so that the generated first VRF table includes only the local route. Alternatively, when determining that the obtained route is the local route, the network device may directly generate the first VRF table based on the obtained local route. The local route may be a route used to reach user equipment connected to the network device, for example, a route of a VM mounted to the network device.

In this embodiment, fast and loop-free packet forwarding may be implemented by using the obtained first VRF table. The first VRF table may be generated in a plurality of manners. This improves flexibility of implementing the solution.

Optionally, in a possible implementation, the method further includes: if the first packet does not carry the tunnel attribute information, for example, when the first packet is a packet sent by a local VM to the network device, the network device forwards the first packet based on the second VRF table. The second VRF table includes a plurality of routes, and the plurality of routes includes the one or more local routes and one or more routes whose next-hop outbound interfaces are remote outbound interfaces. In other words, the second VRF table may include a remote route and a local route. For example, the second VRF table may be a VRF table obtained through learning by the network device from a local network device and another network device. In this case, because the first packet is sent from a user side of the network device, the loop does not occur. Therefore, a route may be selected by using the second VRF table including both the remote route and the local route, to implement load balancing of traffic forwarding.

Optionally, in a possible implementation, that the network device forwards the first packet based on the first VRF table includes: the network device determines, based on a destination address of the first packet, a first route used to forward the first packet in the first VRF table. The first route belongs to the one or more local routes. The network device forwards the first packet based on the first route. In other words, the network device determines, based on the destination address of the first packet, one or more routes that may be used to forward the first packet in the first VRF table. Prefixes of the one or more routes match the destination address of the first packet. Then, the network device may determine, according to a load balancing policy, the first route as a route used to forward the first packet in the one or more routes, and finally forward the first packet based on the first route.

Optionally, in a possible implementation, the method further includes: the network device receives a second packet, and the second packet includes the destination address. The network device determines, based on the tunnel attribute information carried in the second packet and the destination address in the second packet, a second route used to forward the second packet in the first VRF table. The second route belongs to the one or more local routes. The network device forwards the second packet based on the second route. In other words, for the packet carrying the tunnel attribute information, the network device may forward the packet based on the first VRF table. In this way, on the basis of ensuring loop-free traffic forwarding, the load balancing of the traffic forwarding is implemented, and proper virtual machine resource utilization is ensured.

Optionally, in a possible implementation, the tunnel attribute information may be VXLAN tunnel attribute information, multi-protocol label switching (MPLS) tunnel attribute information, or segment routing (SR) tunnel attribute information.

Optionally, in a possible implementation, the network device is a device connected to a plurality of virtual machines in a data center network. For example, the network device may be an access switch (for example, a leaf switch in a data center) or an access router connected to a server on which one or more VMs are deployed.

A second aspect of the embodiments provides a network device. The network device includes a first VRF table and a second VRF table. The network device further includes a receiving unit, configured to receive a first packet; and a processing unit, configured to: if the first packet carries tunnel attribute information, forward the first packet based on the first VRF table. The first VRF table includes one or more local routes, and next-hop outbound interfaces of the one or more local routes are all local outbound interfaces.

Optionally, in a possible implementation, the processing unit is further configured to: generate the first VRF table based on a fact that an obtained route is a local route; or determine a route whose next hop is a local outbound interface in the second VRF table and generate the first VRF table based on the route whose next hop is the local outbound interface in the second VRF table.

Optionally, in a possible implementation, the processing unit is further configured to: if the first packet does not carry the tunnel attribute information, forward the first packet based on the second VRF table. The second VRF table includes a plurality of routes, and the plurality of routes includes the one or more local routes and one or more routes whose next-hop outbound interfaces are remote outbound interfaces.

Optionally, in a possible implementation, the processing unit is further configured to: determine, based on a destination address of the first packet, a first route used to forward the first packet in the first VRF table, where the first route belongs to the one or more local routes; and forward the first packet based on the first route.

Optionally, in a possible implementation, the receiving unit is further configured to: receive a second packet, where the second packet includes the destination address; determine, based on the tunnel attribute information carried in the second packet and the destination address in the second packet, a second route used to forward the second packet in the first VRF table, where the second route belongs to the one or more local routes; and forward the second packet based on the second route.

Optionally, in a possible implementation, the tunnel attribute information may be VXLAN tunnel attribute information, MPLS tunnel attribute information, or SR tunnel attribute information.

Optionally, in a possible implementation, the network device is a device connected to one or more virtual machines in a data center network.

A third aspect of the embodiments provides a network device. The network device includes a processor and a memory. The memory is configured to store an instruction. The processor is configured to execute the instruction in the memory, so that the network device performs the method according to any one of the possible implementations of the first aspect.

A fourth aspect of the embodiments provides a network device. The network device includes a processor. The processor is coupled to a memory, and the processor is configured to execute an instruction in the memory, so that the network device performs the method according to any one of the possible implementations of the first aspect.

A fifth aspect of the embodiments provides a computer storage medium. The computer storage medium may be non-volatile. The computer storage medium stores a computer-readable instruction, and when the computer-readable instruction is executed by a processor, the method in any manner in the first aspect is implemented.

A sixth aspect of the embodiments provides a computer program product, including an instruction. When the computer program product is run on a computer, the computer is enabled to perform the method in any manner of the first aspect.

A seventh aspect of the embodiments provides a chip system. The chip system includes a processor, configured to support a network device in implementing functions in the foregoing aspects, for example, sending or processing data and/or information in the foregoing method. In a possible implementation, the chip system further includes a memory. The memory is configured to store a necessary program instruction and necessary data of the network device. The chip system may include a chip or may include a chip and another discrete device.

It can be understood from the foregoing solutions that the embodiments of the embodiments have at least the following advantages.

The embodiments provide the packet forwarding method and the network device. On one hand, the network device may selectively forward a packet based on whether the packet comes from the network side, for example, a peer tunnel endpoint device on the network side, based on the first VRF table including only the local route, or based on the second VRF table including both the remote route and the local route. For example, when the network device receives the packet from the transmission tunnel (such as the packet forwarded by the another tunnel endpoint device), the network device forwards the packet based on the first VRF table including only the route whose next hop is the local outbound interface, to prevent the packet from being forwarded to the another tunnel endpoint device again. In other words, this avoids the routing loop and ensures the normal packet forwarding. On the other hand, the network device may separately implement the load balancing based on the first VRF table and the second VRF table, to ensures, to some extent, balanced resource usage of the traffic forwarding.

DETAILED DESCRIPTION OF THE EMBODIMENTS

To make objectives, solutions, and advantages of the embodiments clearer, the following describes embodiments with reference to accompanying drawings. It is clear that the described embodiments are merely some but not all of the embodiments. A person of ordinary skill in the art may understand that, as a new application scenario emerges, the solutions provided in the embodiments are also applicable to a similar problem.

In the embodiments and the accompanying drawings, the terms "first", "second", and the like are intended to distinguish similar objects but do not necessarily indicate a specific order or sequence. It should be understood that the data termed in such a way is interchangeable in a proper circumstance, so that the embodiments described herein can be implemented in other orders than the order illustrated or described herein. In addition, the terms "include", "contain" and any other variants mean to cover the non-exclusive inclusion, for example, a process, method, system, product, or device that includes a list of steps or modules is not necessarily limited to the expressly listed steps or modules, but may include other steps or modules not expressly listed or inherent to such a process, method, product, or device. Names or numbers of the steps in the embodiments do not mean that the steps in the method procedure need to be performed in a chronological/logical order indicated by the names or numbers. An execution sequence of the steps in the procedure that have been named or numbered may be changed based on objectives to be implemented, provided that a same or similar effect can be achieved. Division into units in the embodiments is logical division and may be other division in an actual implementation. For example, a plurality of units may be combined or integrated into another system, or some features may be ignored or not performed. In addition, the displayed or discussed mutual couplings or direct couplings or communications connections may be implemented through some interfaces. The indirect couplings or communications connections between the units may be implemented in electronic or other forms. This is not limited in the embodiments. In addition, units or subunits described as separate parts may or may not be physically separate, may or may not be physical units, or may be distributed in a plurality of circuit units. Some or all of the units may be selected based on actual requirements to achieve the objectives of the solutions of the embodiments.

In conventional mobile communications networks such as a 2nd generation (2G) communications network, a 3rd generation (3G) communications network, and a 4th generation (4G) communications network, most telecommunications devices each use a dedicated platform structure. In other words, software and hardware of different telecommunications devices are independent of each other. For example, in a 4G network system, a mobility management entity (MME), a serving gateway (S-GW), a packet data network gateway (P-GW), and the like are separately carried by independent frame-type devices or box-type devices. These devices cannot be shared at a software layer and a hardware layer. In other words, if MME load is low in an equipment room, an MME board cannot be removed and inserted into a to-be-overloaded S-GW network element.

With an integrated delivery and large-scale deployment of a data center, and increasing maturity of the 5th generation (5G) communications technology, a network functions virtualization (NFV) technology, and a cloud technology, a telecommunications network element is gradually migrating from a dedicated hardware platform to a universal hardware platform in the data center, and deployed on a VM of a server in the data center in a form of a VNF network element, to form a telecommunications cloud data center network.

Currently, in the data center, there are features such as centralized data exchange and increasing east-west traffic, and a requirement for a data center network is further improved. To adapt to the foregoing changes, the data center network transforms from a conventional virtual local area network (VLAN) to a VXLAN network and a software-defined networking (SDN), to implement adaptation and association between the network and a service and improve resource utilization efficiency and service provisioning efficiency. The VXLAN is a network virtualization technology in which a data packet sent from a source host is encapsulated into a user datagram protocol (UDP), an IP and MAC of a physical network are used as an outer header for encapsulation, and then the data packet is transmitted over the network. After the data packet reaches a destination, a tunnel endpoint decapsulates the data packet and sends data to a target host. The VXLAN technology may be used to construct a layer 2 virtual network on an existing layer 3 network, to implement layer 2 communication between VMs.

Figure 1:
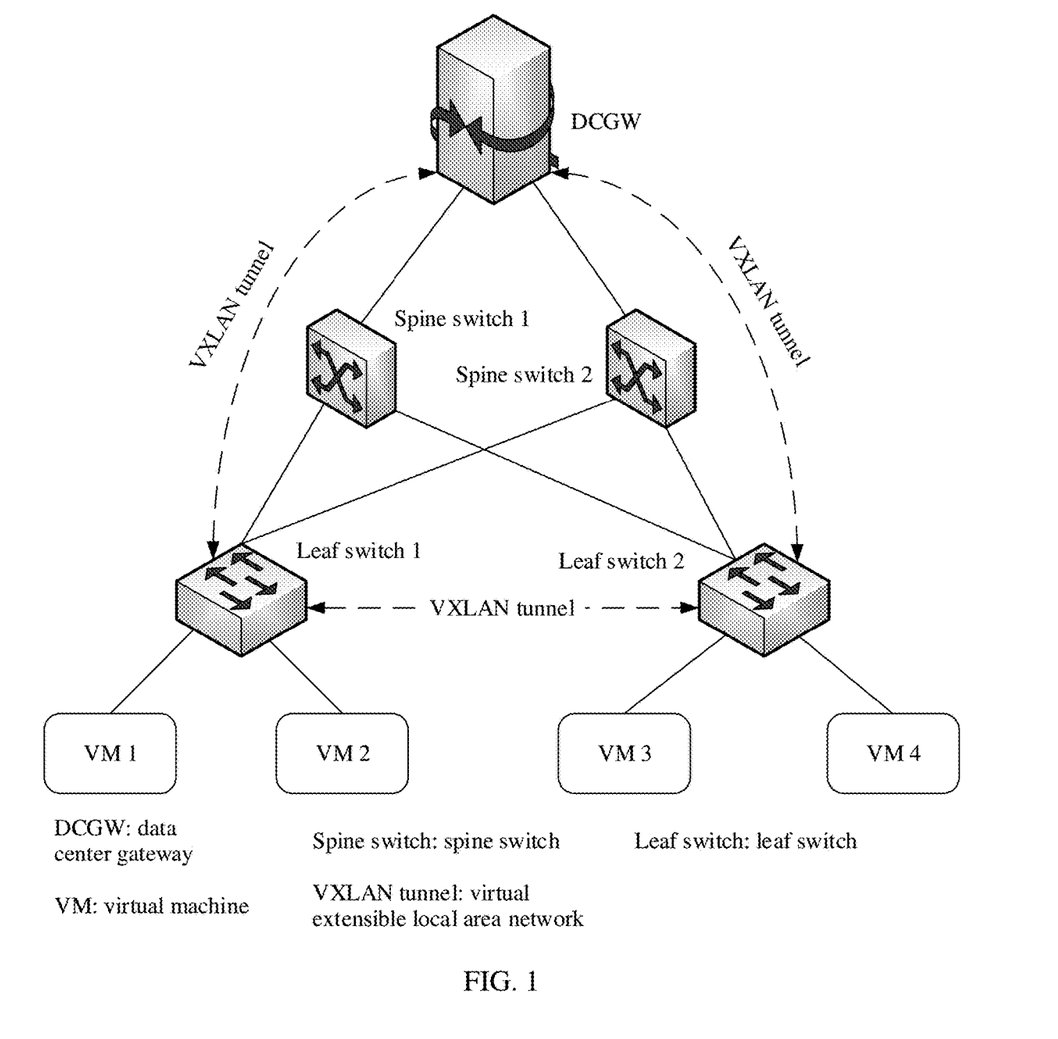
FIG. 1 is a schematic diagram of networking of a data center according to an embodiment.

For details, refer to FIG. 1, which is a schematic diagram of networking of a data center according to an embodiment. In the data center, typical VXLAN networking may include a data center gateway (DCGW), a spine switch, a leaf switch, and a VM. The DCGW may be connected to one or more spine switches, the spine switch may be connected to one or more leaf switches, and the leaf switch may be connected to one or more VMs. A VXLAN tunnel may be established between the DCGW and the leaf switch, and a VXLAN tunnel may also be established between leaf switches.

For ease of understanding, the following explains terms used on a VXLAN network.

A VTEP device is a network device that can encapsulate and decapsulate a VXLAN packet. A source IP address of the VXLAN packet is an IP address of a source end VTEP device, and a destination IP address of the VXLAN packet is an IP address of a destination end VTEP device. One pair of VTEP addresses corresponds to one VXLAN tunnel. After encapsulating the packet, the source end VTEP device sends the encapsulated packet to the destination end VTEP device through a tunnel, and then the destination end VTEP device decapsulates the received encapsulated packet. The leaf switch device in FIG. 1 may have a capability of encapsulating and decapsulating the VXLAN packet. That is, the leaf switch device in FIG. 1 is a VTEP device.

A network virtualization edge (NVE) device is a network entity that implements a network virtualization function. After a packet is encapsulated and converted by the NVE device, a layer 2 virtual network may be established between NVE devices based on a layer 3 underly network. The leaf switch device in FIG. 1 is an NVE device. The VTEP device is a type of the NVE device.

A layer 2 gateway (Level-2 GateWay or L2GW) is similar to a layer 2 access device of a conventional network. On the VXLAN network, the L2GW allows a tenant to access a VXLAN virtual network and allows communication between subnets on a same VXLAN network.

A concept of a layer 3 gateway (Level-3 Gateway or L3GW) is introduced to perform communication between VXLAN networks and communication between the VXLAN network and a non-VXLAN network. The L3GW may be used for cross-subnet communication of the VXLAN network and external network access. The leaf switch in FIG. 1 may be used as an L2GW or an L3GW or may be used as both an L2GW and L3GW. In other words, the leaf switch may be the L2GW/L3GW.

Generally, traffic of a data center network may be divided into north-south traffic and east-west traffic. The north-south traffic refers to traffic from an external network to the data center network and traffic from the data center network to the external network. When the north-south traffic is transmitted in a data center, one endpoint of a VXLAN tunnel is at the DCGW, and the other endpoint is at the leaf switch. In other words, the traffic is transmitted from the DCGW to the leaf switch or from the leaf switch to the DCGW. The east-west traffic refers to traffic between VMs in the data center. When the east-west traffic is transmitted in the data center, both the endpoints of the VXLAN tunnel are at leaf switches. In other words, the traffic is generally transmitted from one leaf switch to the other leaf switch. When traffic flows from the DCGW to a leaf switch or from another leaf switch to a leaf switch, the traffic belongs to traffic flowing from a network side. When traffic flows from a user-side device or a user network to a leaf switch, for example, the traffic flows from a VM mounted to the leaf switch to the leaf switch, the traffic belongs to traffic flowing from a user side.

Figure 2A:
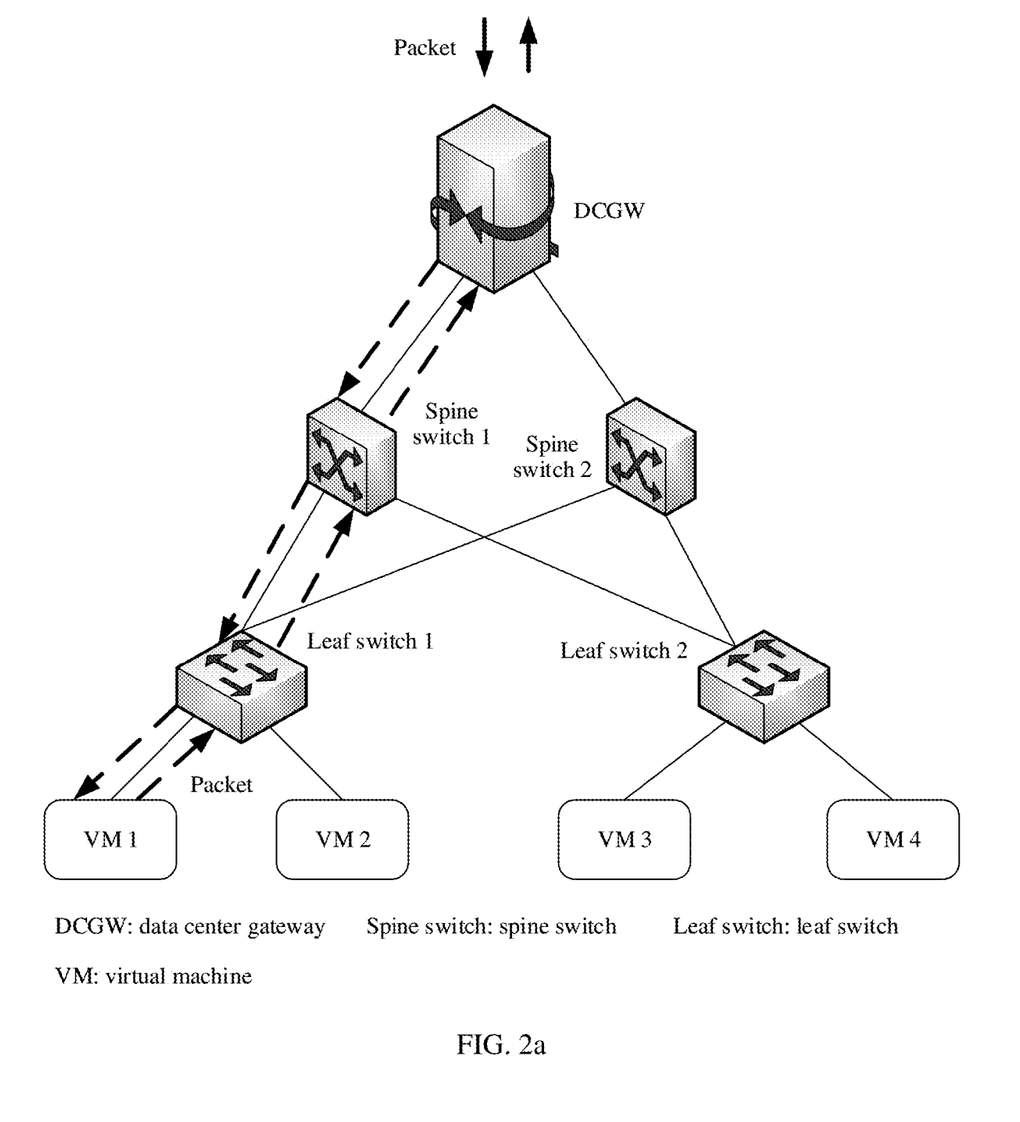
FIG. 2a is a schematic diagram of north-south traffic according to an embodiment.

For details, refer to FIG. 2a which is a schematic diagram of north-south traffic according to an embodiment. As shown in FIG. 2a, a packet entering a data center from an external network is forwarded by a DCGW to a leaf switch 1 by using a spine switch 1 and is finally forwarded by the leaf switch 1 to a VM 1 connected to the leaf switch 1. Similarly, the VM 1 sends a packet generated by the VM 1 to the leaf switch 1, the leaf switch 1 forwards the packet to the DCGW by using the spine switch 1, and finally the DCGW sends the packet to the external network. Both traffic from the DCGW to the VM 1 and traffic from the VM 1 to the DCGW may be referred to as the north-south traffic.

Figure 2B:
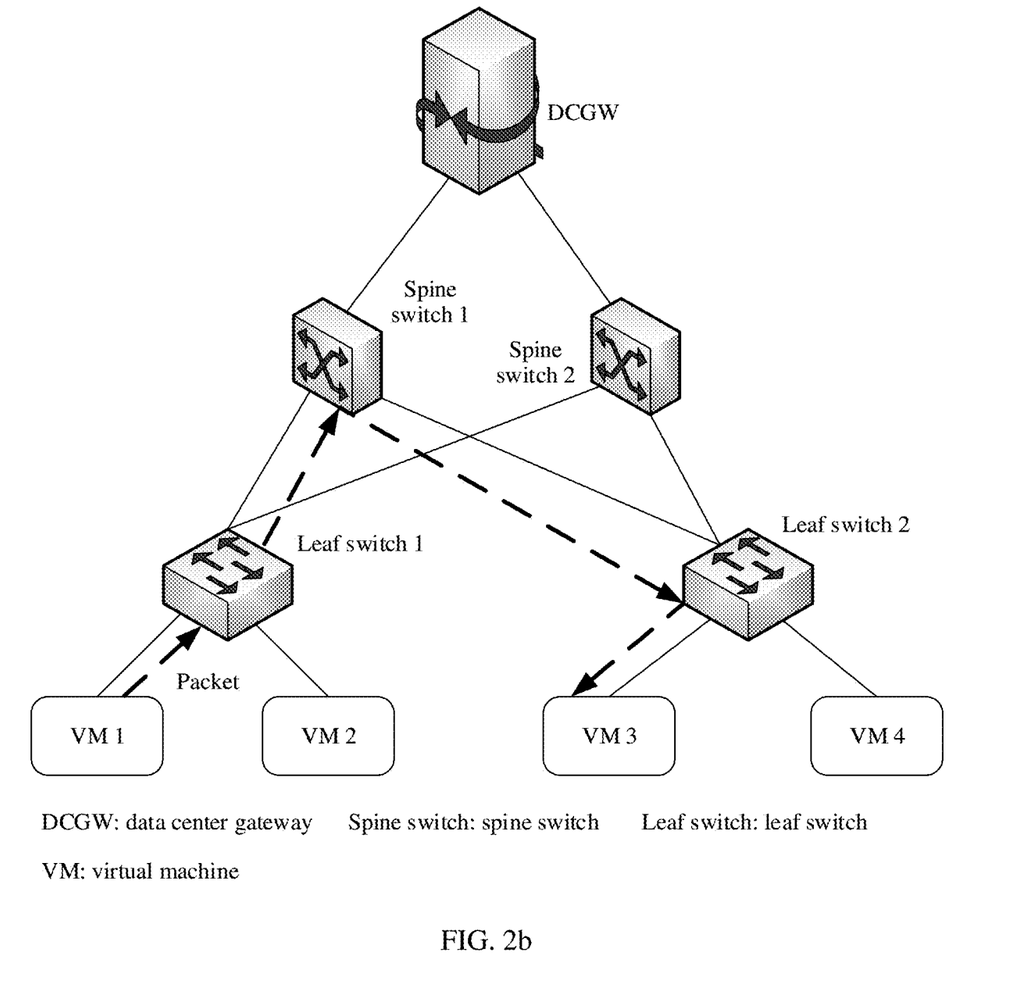
FIG. 2b is a schematic diagram of east-west traffic according to an embodiment.

FIG. 2b is a schematic diagram of east-west traffic according to an embodiment. As shown in FIG. 2b, a VM 1 sends a packet generated by the VM 1 to a leaf switch 1, the leaf switch 1 forwards the packet to a leaf switch 2 by using a spine switch 1, and finally the leaf switch 2 sends the packet to a VM 3. Traffic from the VM 1 to the VM 3 may be referred to as the east-west traffic.

Generally, when an SDN is deployed on a VXLAN network, a leaf switch can implement shortest-path forwarding for east-west traffic between two VMs in different subnets. A spine switch forwards the traffic to the other nearest VM, to prevent inter-subnet traffic from being diverted to a DCGW and form a traffic bottleneck.

Figure 3:
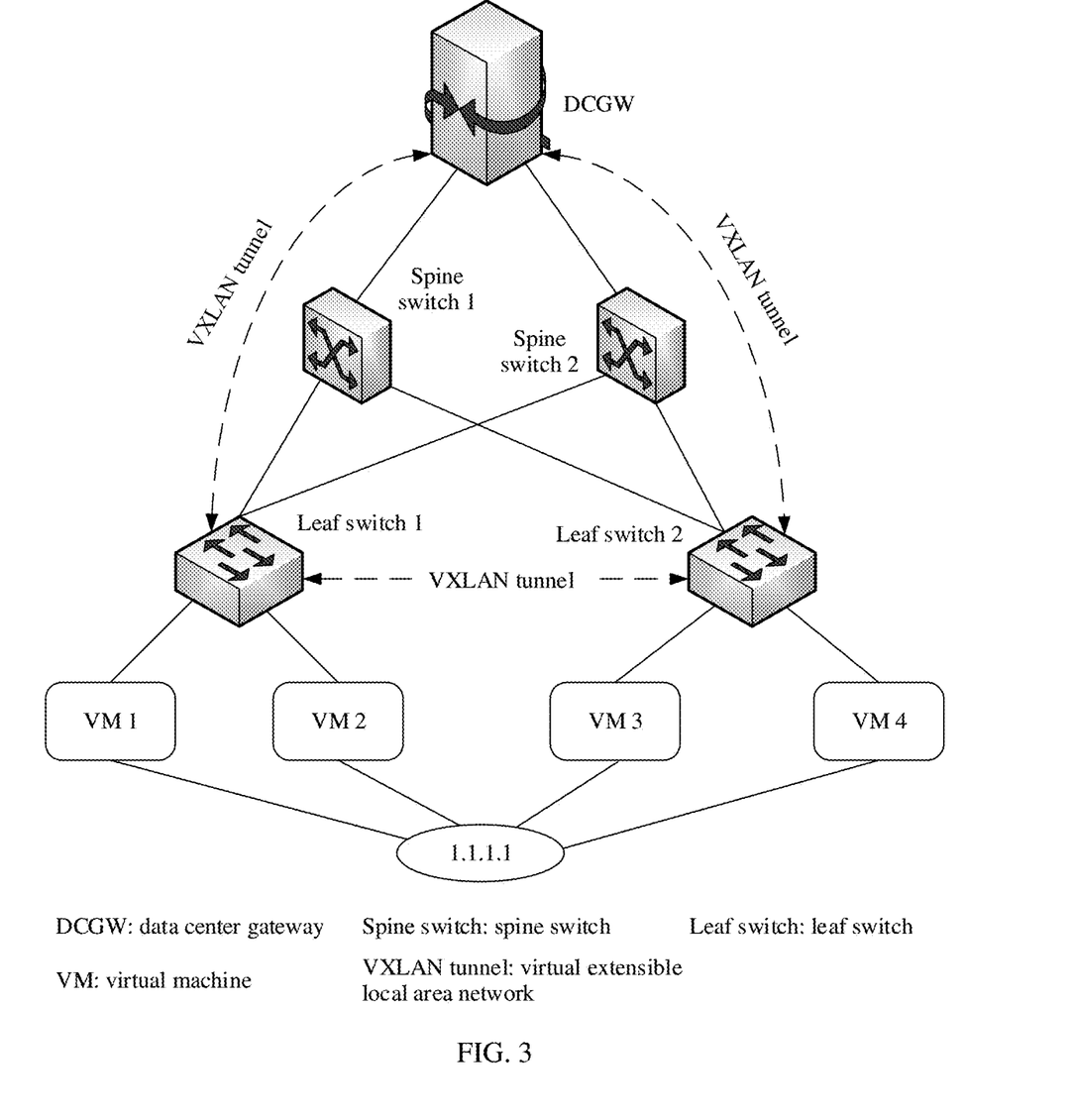
FIG. 3 is a schematic diagram of a service scenario according to an embodiment.

In the data center network, a VM can be deployed randomly. Under a specific condition, the VM can even be dynamically migrated. In this way, when a VNF network element is distributed on a plurality of VMs, the plurality of VMs share a same IP address, and the plurality of VMs may be deployed on different racks. In other words, the plurality of VMs are connected to different leaf switches. FIG. 3 is a schematic diagram of a service scenario according to an embodiment of the embodiments. A VNF network element is distributed on a VM 1 to a VM 4, and the VM 1 to the VM 4 may share a same IP address (the IP address may be, for example, 1.1.1.1). The VM 1 and the VM 2 are connected to a leaf switch 1, and the VM 3 and the VM 4 are a connected to a leaf switch 2. In this way, when the leaf switch 1 or the leaf switch 2 forwards a packet whose IP address is 1.1.1.1, a corresponding next hop may be a local VM, or may be a remote VM. Herein, a route whose next hop is the local VM of the leaf switch 1 is referred to as a local route, and a route whose next hop is the remote VM is referred to as a remote route. The remote VM is a VM mounted to another leaf switch different from the leaf switch 1.

For example, for the leaf switch 1 shown in FIG. 3, a VRF table of the leaf switch 1 may be:
prefix: 1.1.1.1 nexthop: VM 1 (local)
(--prefix: 1.1.1.1 next hop: VM 1 (local))
prefix: 1.1.1.1 nexthop: VM 2 (local)
(--prefix: 1.1.1.1 next hop: VM 2 (local))
prefix: 1.1.1.1 nexthop: VM 3 (remote)
(--prefix: 1.1.1.1 next hop: VM 3 (remote))
prefix: 1.1.1.1 nexthop: VM 4 (remote)
(--prefix: 1.1.1.1 next hop: VM 4 (remote))

In other words, when the prefix (such as a destination address) is 1.1.1.1, next-hop routes corresponding to the leaf switch 1 include two local routes (the next hops are the VM 1 and the VM 2) and two remote routes (the next hops are the VM 3 and the VM 4).

For the leaf switch 2 shown in FIG. 3, a VRF table of the leaf switch 2 may be:
prefix: 1.1.1.1 nexthop: VM 1 (remote)
(--prefix: 1.1.1.1 next hop: VM 1 (remote))
prefix: 1.1.1.1 nexthop: VM 2 (remote)
(--prefix: 1.1.1.1 next hop: VM 2 (remote))
prefix: 1.1.1.1 nexthop: VM 3 (local)
(--prefix: 1.1.1.1 next hop: VM 3 (local))
prefix: 1.1.1.1 nexthop: VM 4 (local)
(--prefix: 1.1.1.1 next hop: VM 4 (local))

Similarly, when the prefix (such as the destination address) is 1.1.1.1, next-hop routes corresponding to the leaf switch 2 include two remote routes (the next hops are the VM 1 and the VM 2) and two local routes (the next hops are the VM 3 and the VM 4).

Generally, to implement VM-based load balancing of the VNF network element, a plurality of VMs evenly share a service of the VNF network element, a local route and a remote route are equivalent on a leaf switch. In other words, when the leaf switch forwards a packet corresponding to an IP address, the leaf switch may equivalently select one of a plurality of local routes and/or remote routes corresponding to the IP address, and forward the packet based on the selected route.

In this way, when a plurality of VMs that share a same IP address are connected to different leaf switches, a routing loop is likely to occur. For example, when the leaf switch 1 receives a packet whose destination address is 1.1.1.1, the leaf switch 1 selects the VM 3 or the VM 4 from the VM 1 to the VM 4 as a next-hop route. Because the VM 3 and the VM 4 are connected to the leaf switch 2, the leaf switch 1 forwards the packet to the leaf switch 2 by using the spine switch 1. When the leaf switch 2 receives the packet forwarded by the spine switch 1, the leaf switch 2 may select the VM 1 or the VM 2 as a next-hop route. Therefore, the leaf switch 2 forwards the packet to the leaf switch 1 by using a spine switch 2. In other words, the packet is always forwarded between the leaf switch 1 and the leaf switch 2, and cannot reach the destination address, causing the routing loop.

Figure 4:
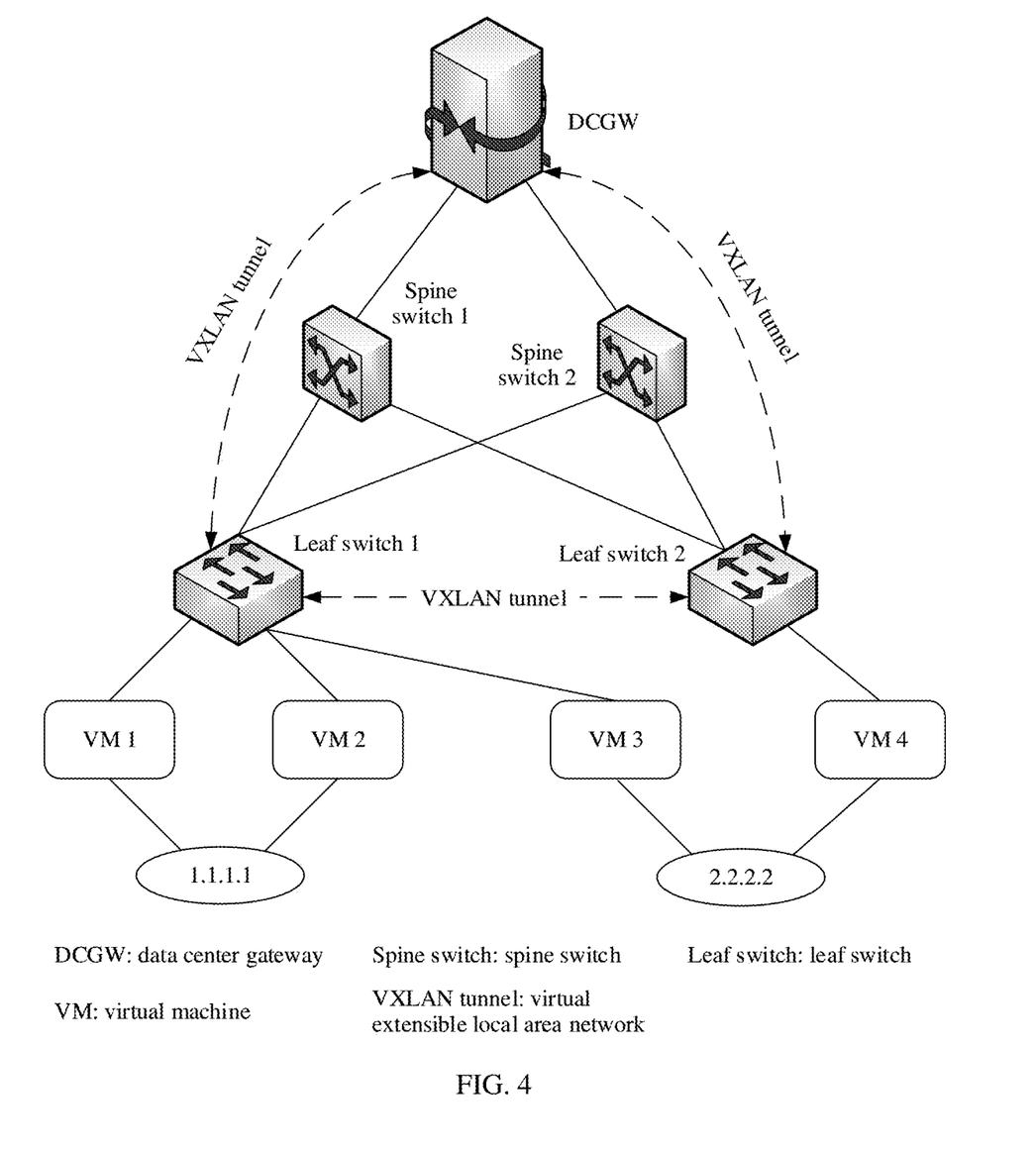
FIG. 4 is a schematic diagram of another scenario according to an embodiment.

In addition, if the leaf switch selects the local route to forward a packet, packet forwarding pressure is centralized on the local VM although the loop can be resolved. As a result, it is difficult to implement load balancing of an entire network. FIG. 4 is a schematic diagram of another scenario according to an embodiment. A VNF network element 1 is distributed on a VM 1 and a VM 2, and the VM 1 and the VM 2 share an IP address 1.1.1.1. A VNF network element 2 is distributed on a VM 3 and a VM 4, and the VM 3 and the VM 4 share an IP address 2.2.2.2. The VM 1 to the VM 3 are connected to a leaf switch 1, and the VM 4 is connected to a leaf switch 2.

In this case, for the leaf switch 1 shown in FIG. 4, a VRF table of the leaf switch 1 may be:
prefix: 1.1.1.1 nexthop: VM 1 (local)
(--prefix: 1.1.1.1 next hop: VM 1 (local))
prefix: 1.1.1.1 nexthop: VM 2 (local)
(--prefix: 1.1.1.1 next hop: VM 2 (local))
prefix: 2.2.2.2 nexthop: VM 3 (local)
(--prefix: 2.2.2.2 next hop: VM 3 (local))
prefix: 2.2.2.2 nexthop: VM 4 (remote)
(--prefix: 2.2.2.2 next hop: VM 4 (remote))

For the leaf switch 2 shown in FIG. 4, a VRF table of the leaf switch 2 may be:
prefix: 1.1.1.1 nexthop: VM 1 (remote)
(--prefix: 1.1.1.1 next hop: VM 1 (remote))
prefix: 1.1.1.1 nexthop: VM 2 (remote)
(--prefix: 1.1.1.1 next hop: VM 2 (remote))
prefix: 2.2.2.2 nexthop: VM 3 (remote)
(--prefix: 2.2.2.2 next hop: VM 3 (remote))
prefix: 2.2.2.2 nexthop: VM 4 (local)
(--prefix: 2.2.2.2 next hop: VM 4 (local))

In this embodiment, information in the foregoing VRF tables is intended to describe the application scenario of this embodiment more clearly. It can be understood that, in an actual application, content and a style of the information presented in the VRF tables may be designed as required. In the scenario shown in FIG. 4, if a leaf switch 1 selects a local route when forwarding a packet, when the leaf switch 1 receives a packet sent by the VM 1 or the VM 2, and a destination address of the packet is 2.2.2.2, the leaf switch 1 always selects to forward the packet to the local VM 3 according to a rule of selecting a local route. As a result, the VM 3 is always in a heavy-load state while the VM 4 is always in an idle state. In this way, load balancing cannot be implemented.

The foregoing description uses a network structure shown in FIG. 1 as an example. It may be understood that a possible structure of the data center network is not limited thereto. For example, the data center network may alternatively not include a spine switch, or a layer 2 leaf switch is further connected to a leaf switch, and then the layer 2 leaf switch is mounted to VM user equipment, and the like. The layer 2 leaf switch may also be understood as a user-side device. However, in different network structures, the foregoing problem may still exist.

In view of this, an embodiment provides a packet forwarding method. When a network device receives a packet from a transmission tunnel (such as a packet forwarded by another tunnel endpoint device), the network device forwards the packet based on a virtual routing and forwarding (VRF) table including only a route whose next hop is a local outbound interface, to prevent the packet from being forwarded to another tunnel endpoint device again. This avoids a routing loop and ensures accurate packet forwarding.

The packet forwarding method provided in this embodiment may be applied to a network architecture in which a VXLAN tunnel is deployed and that is shown in FIG. 3 or FIG. 4, or may be applied to a network architecture in which another transmission tunnel (for example, an MPLS tunnel or an SR tunnel) is deployed. This is not limited herein.

Figure 5:
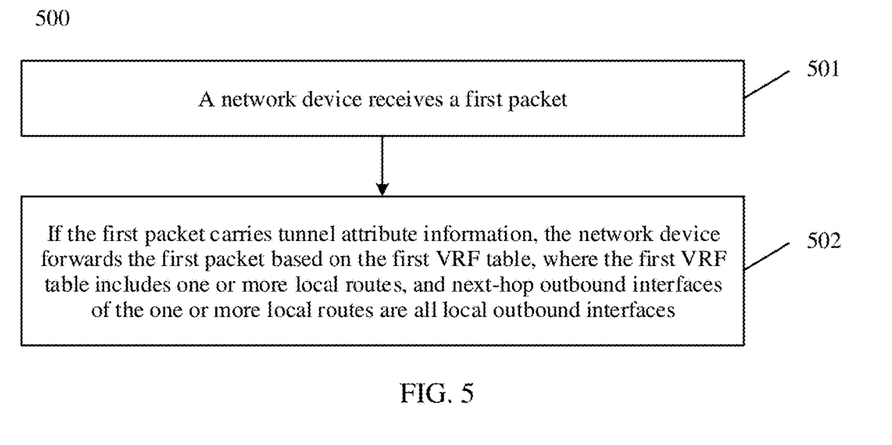
FIG. 5 is a schematic flowchart of a packet forwarding method according to an embodiment.

FIG. 5 is a schematic flowchart of a packet forwarding method 500 according to an embodiment. As shown in FIG. 5, the packet forwarding method 500 provided in this embodiment includes the following steps.

501: A network device receives a first packet.

In this embodiment, the network device is a device connected to one or more VMs in a data center network. For example, the network device may be an access switch (for example, a leaf switch) or an access router connected to a server on which the one or more VMs are deployed. The network device may receive a packet sent by another device and forward the packet to a VM connected to the network device. The network device may alternatively receive a packet sent by a VM connected to the network device and forward the packet to another device. FIG. 3 or FIG. 4 is used as an example. The network device may be the leaf switch 1, and another device may be the leaf switch 2. Alternatively, the network device may be the spine switch 1, and another device may be the spine switch 2. Herein, the first packet may be the packet sent by the VM connected to the network device, or may be the packet sent by another network device, for example, a packet sent by a spine switch to the network device.

502: If the first packet carries tunnel attribute information, the network device forwards the first packet based on the first VRF table. The first VRF table includes one or more local routes, and next-hop outbound interfaces of the one or more local routes are all local outbound interfaces.

In this embodiment, after the network device receives the first packet, the network device determines whether the first packet carries the tunnel attribute information. If the first packet carries the tunnel attribute information, it indicates that the first packet is transmitted to the network device through a tunnel on a network side. For example, the first packet is sent by a VTEP device on the network side. The VXLAN scenario shown in FIG. 3 is still used as an example. If the first packet carries VXLAN tunnel attribute information, the first packet may be transmitted by a DCGW to the network device through a VXLAN tunnel between the DCGW and the network device and continues to be forwarded by the network device. If the first packet does not carry the VXLAN tunnel attribute information, the first packet may be a packet that needs to be sent by a VM mounted to the network device and may be sent by the network device to a VM mounted to another device (for example, another leaf switch).

Therefore, when the first packet carries the tunnel attribute information, the network device forwards the first packet based on the first VRF table, to avoid a routing loop caused when the network device selects a remote route during first packet forwarding. The network device includes the first VRF table and a second VRF table, in other words, the network device includes two VRF tables used to implement packet forwarding. For example, the first VRF table includes the one or more local routes. The local route is a route that is used to reach a user-side device connected to the network device, for example, a route of a VM mounted to the leaf switch 1. The next-hop outbound interfaces of the one or more local routes are all the local outbound interfaces, in other words, the first VRF table includes only the local routes. In other words, when the network device forwards the first packet based on the first VRF table, it can be ensured that a route selected by the network device is a local route instead of the remote route. The remote route may be a route that is in the VRF table stored in the network device and that is used to reach a user-side device mounted to another network device, for example, a route of a VM mounted to the leaf switch 2.

For example, that the network device forwards the first packet based on the first VRF table may include: the network device determines, based on a destination address of the first packet, a first route used to forward the first packet in the first VRF table. The first route belongs to the one or more local routes. The network device forwards the first packet based on the first route. In other words, the network device determines, based on the destination address of the first packet, one or more routes that may be used to forward the first packet in the first VRF table. Prefixes of the one or more routes match the destination address of the first packet. Then, the network device may determine, according to a specific forwarding policy, for example, a load balancing policy, the first route in the one or more routes as a route used to forward the first packet, and finally forward the first packet based on the first route. For example, if the network device determines, based on the destination address of the first packet, that routes that can be used to forward the first packet include the first route, a second route, and a third route in the first VRF table, the network device may select, according to the load balancing policy, the proper first route as the route used to forward the first packet.

When the network device receives a second packet and the second packet includes a destination address the same as that of the first packet, the network device may determine, based on the tunnel attribute information carried in the second packet and the destination address in the second packet, a second route used to forward the second packet in the first VRF table. The second route belongs to the one or more local routes. In other words, when receiving the second packet, the network device randomly selects, according to the load balancing policy, the second route as a route used to forward the second packet. In other words, for a packet carrying the tunnel attribute information, the network device may implement load balancing of the packet forwarding based on the first VRF table and ensure proper virtual machine resource utilization. The load balancing policy may be implemented based on, for example, an equal-cost multipath (ECMP) routing.

In this way, when the network device receives the packet carrying the tunnel attribute information, the network device forwards the packet based on the VRF table including only the local routes, to prevent the packet from being forwarded to another tunnel endpoint device again. This avoids a routing loop, and ensures normal packet forwarding.

It should be noted that in this embodiment, the network device further includes the second VRF table. If the first packet does not carry the tunnel attribute information, the network device forwards the first packet based on the second VRF table. The second VRF table includes a plurality of routes, and the plurality of routes includes the one or more local routes and one or more routes whose next-hop outbound interfaces are remote outbound interfaces. In other words, the second VRF table may include the remote route and the local routes. For example, the second VRF table may be a VRF table obtained through learning by the network device. The network device obtains the second VRF table by learning a route advertised by another device on a network and a route on a local server. For example, the network device establishes a border gateway protocol peer (BGP Peer) relationship with a route reflector (RR) on the network. When obtaining a new route, the RR may advertise a route to a BGP peer connected to the RR, so that the network device can learn the route and generate or update the second VRF table.

In a possible implementation, if the first packet does not carry the tunnel attribute information, that the network device forwards the first packet based on the second VRF table may be implemented by configuring a logical interface of the network device. For example, the logical interface "a vbdif interface" of the network device, such as a local service port, may be configured to bind with the second VRF table. In other words, all packets received by the network device from the vbdif interface are forwarded based on the bound second VRF table. The vbdif interface is the local service port in the network device and is mainly configured to receive a packet sent by a user-side device of the network device, for example, the VM mounted to the network device, and does not receive a packet sent by another tunnel endpoint device. Therefore, by binding the vbdif interface with the second VRF table, a packet received locally can be normally forwarded based on the second VRF table. In this embodiment, the network device may obtain the first VRF table in a plurality of manners.

Figure 6A:
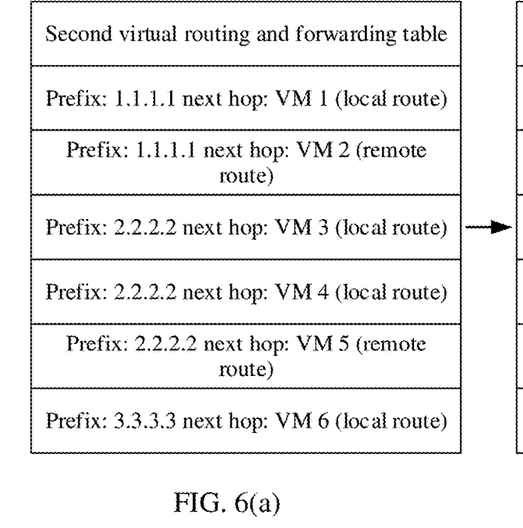
FIG. 6a and FIG. 6b are a schematic diagram of a VRF table according to an embodiment.
Figure 6B:
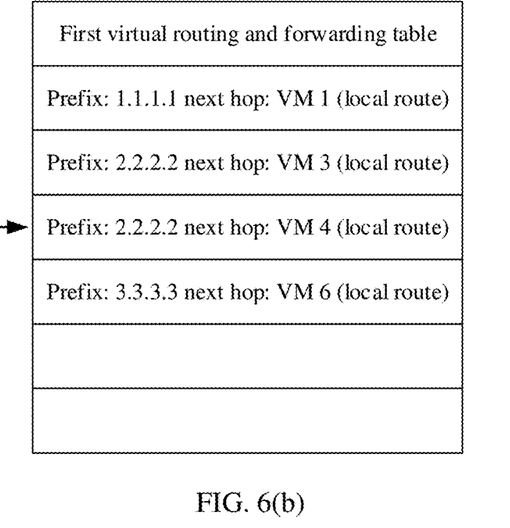

In a possible implementation, the network device may generate the first VRF table based on the second VRF table. For example, the network device determines a route whose next hop is a local outbound interface in the second VRF table. In other words, the network device determines a local route in the second VRF table and generates the first VRF table based on the route whose next hop is the local outbound interface in the second VRF table. In other words, the network device may generate the first VRF table by copying the local route in the second VRF table, so that the generated first VRF table includes only the local route. For details, refer to FIG. 6*a* and FIG. 6*b*, which are schematic diagrams of a VRF table according to an embodiment. FIG. 6(*a*) represents a second VRF table, and FIG. 6(*b*) represents a first VRF table generated based on the second VRF table. It can be seen from FIG. 6*a* and FIG. 6*b* that, the second VRF table includes a local route and a remote route, but the first VRF table includes only the local route. In addition, the local route included in the first VRF table is the same as the local route included in the second VRF table.

In another possible implementation, a network device may generate the first VRF table based on a fact that an obtained route is the local route. For example, when the network device obtains a route, for example, when the network device receives a new route advertised by a BGP peer, the network device determines whether the obtained route is the local route. If the obtained route is the local route, the network device generates or updates the first VRF table based on the obtained local route.

Figure 7:
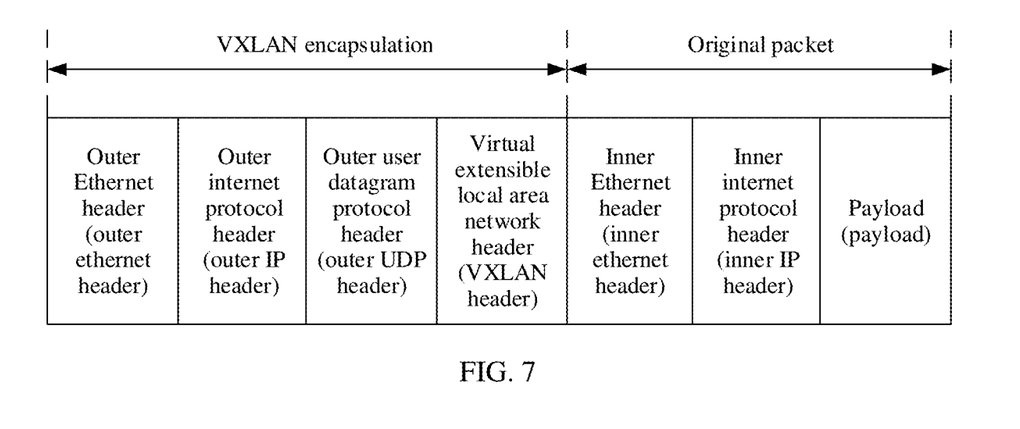
FIG. 7 is a schematic diagram of encapsulation of a VXLAN tunnel packet according to an embodiment.

It may be understood that when a tunnel endpoint device transmits a packet through a tunnel, the tunnel endpoint device used as a source endpoint performs tunnel encapsulation on the packet, and the encapsulated packet carries tunnel attribute information. Therefore, after decapsulating the packet from the tunnel, the network device may determine that the packet carries the tunnel attribute information. For example, a VXLAN tunnel is used as an example. FIG. 7 is a schematic diagram of encapsulation of a VXLAN tunnel packet according to an embodiment. As shown in FIG. 7, an original packet includes a payload, an inner internet protocol header (inner IP header), and an inner ethernet header. After VXLAN tunnel encapsulation is performed on the packet, a VXLAN header is added to the packet, and a standard UDP header is in front of the VXLAN header. Therefore, the packet includes an outer ethernet header, an outer internet protocol header (outer IP header), and an outer user datagram protocol header (outer UDP header). The VXLAN header in the packet or some data bits in the VXLAN header may be used as tunnel attribute information, to identify that the packet is from a VXLAN tunnel. Optionally, after decapsulating the packet and determining that the packet is from the tunnel, the network device may retain some data bits in the packet, to mark a tunnel attribute of the packet and facilitate a subsequent forwarding operation performed on the packet. In another implementation, for a format of the VXLAN packet, refer to the standard RFC 7348. All content of the standard is introduced into the embodiments herein.

It may be understood that the foregoing describes the tunnel attribute information by using an example in which a tunnel is the VXLAN tunnel. In this embodiment, the tunnel attribute information carried in the first packet may be tunnel attribute information, for example, MPLS tunnel attribute information or SR tunnel attribute information. This is not limited in this embodiment.

Although the foregoing method embodiment is described by using the network structure of the data center shown in FIG. 1 as an example, it may be further understood that the network structure of the data center is not a limitation of this method embodiment. In an actual application, this method embodiment may be used to resolve a similar problem in another application scenario or another network structure.

For ease of understanding, the following describes in detail the packet forwarding method provided in the embodiments with reference to examples.

The service scenario shown in FIG. 3 is used as an example. A leaf switch 1 includes a first VRF table and a second VRF table. The first VRF table is:
prefix: 1.1.1.1 nexthop: VM 1 (local)
(--prefix: 1.1.1.1 next hop: VM 1 (local))
prefix: 1.1.1.1 nexthop: VM 2 (local)
(--prefix: 1.1.1.1 next hop: VM 2 (local))

The second VRF table further includes remote routes whose next hops are a VM 3 and a VM 4. For details, refer to the foregoing description.

When the leaf switch 1 includes the first VRF table and the second VRF table, after the leaf switch 1 receives a packet forwarded by a DCGW by using a spine switch 1, the leaf switch 1 may determine that the packet carries VXLAN tunnel attribute information. Therefore, the leaf switch 1 may forward the packet based on the first VRF table. For example, when a destination address of a packet is 1.1.1.1, the leaf switch 1 may determine, in the first VRF table, that a route whose next hop is the VM 1 and a route whose next hop is the VM 2 are routes that may be used to forward the packet. Then, the leaf switch 1 determines, in the foregoing two routes, one route that is used to forward the packet. In this way, the packet is forwarded to the local VM 1 or the local VM 2.

For a packet forwarded to the leaf switch 1 by a tunnel endpoint device, for example, the DCGW or a leaf switch 2, the leaf switch 1 implements packet forwarding based on the first VRF table, to prevent the leaf switch 1 from selecting a remote route and forwarding the packet to the leaf switch 2 again. This prevents a routing loop.

In addition, for the service scenario shown in FIG. 4, when the leaf switch 1 receives a packet that does not carry the tunnel attribute information, the leaf switch 1 forwards the packet based on the second VRF table including a local route and the remote route. In other words, there is no need to select the local route. Therefore, it can be ensured that the leaf switch 1 selects, according to a load balancing policy, one of the local route and the remote route as a route used to forward the packet. For example, it can be ensured that load balancing can be implemented when the leaf switch 1 forwards a packet (such as a local packet) sent by a local VM, and a resource waste is avoided.

Figure 8:
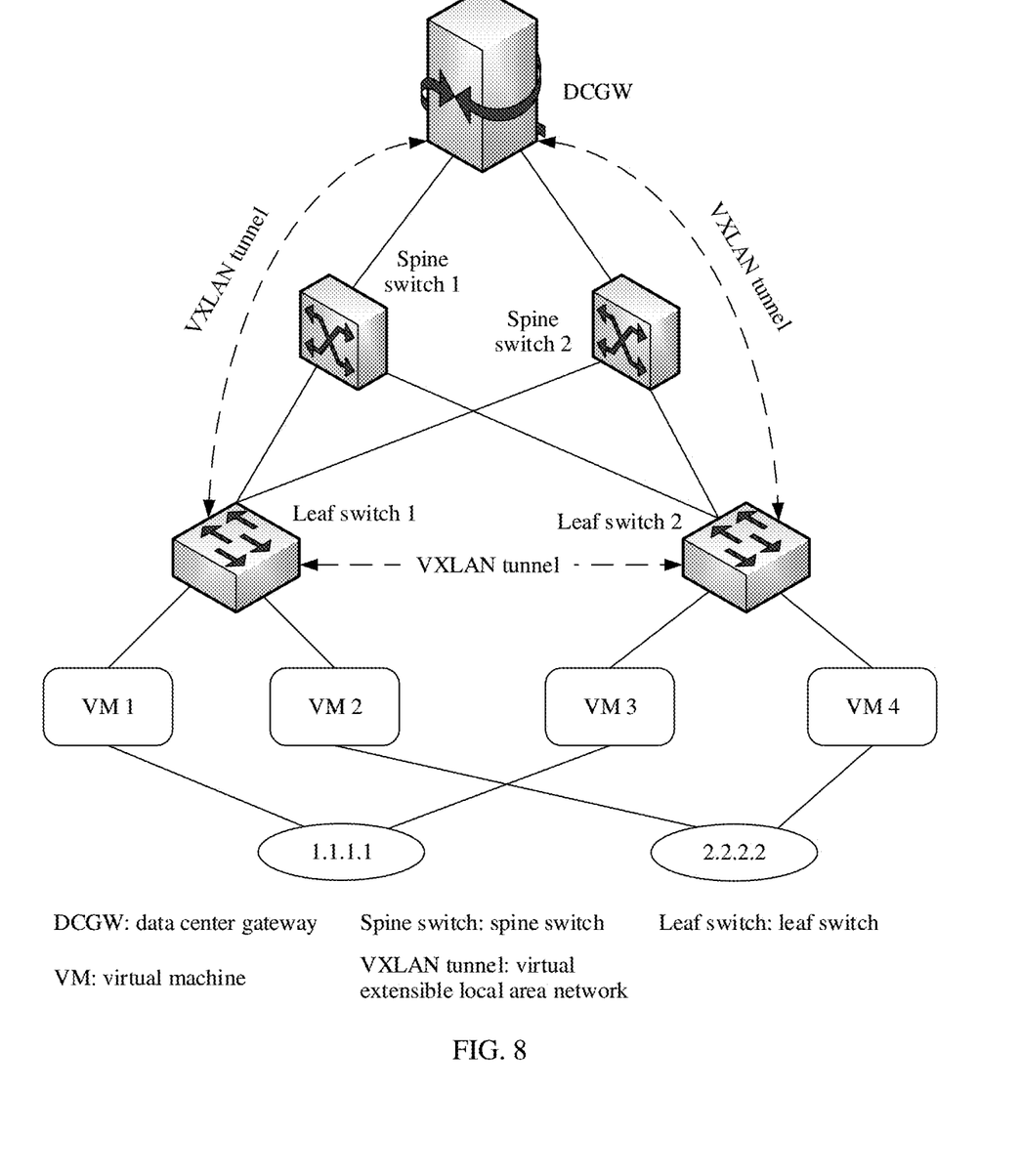
FIG. 8 is a schematic diagram of another service scenario according to an embodiment.

FIG. 8 is a schematic diagram of another service scenario according to an embodiment.

In the service scenario corresponding to FIG. 8, a VNF network element 1 is distributed on a VM 1 and a VM 3, and the VM 1 and the VM 3 share a same IP address 1.1.1.1. A VNF network element 2 is distributed on a VM 2 and a VM 4, and the VM 2 and the VM 4 share a same IP address 2.2.2.2. In addition, the VM 1 and the VM 2 are connected to a leaf switch 1, and the VM 3 and the VM 4 are connected to a leaf switch 2.

For the leaf switch 1, a first VRF table included in the leaf switch 1 is:
prefix: 1.1.1.1 nexthop: VM 1 (local)
(--prefix: 1.1.1.1 next hop: VM 1 (local))
prefix: 2.2.2.2 nexthop: VM 2 (local)
(--prefix: 2.2.2.2 next hop: VM 2 (local))
A second VRF table included in the leaf switch 1 is:
prefix: 1.1.1.1 nexthop: VM 1 (local)
(--prefix: 1.1.1.1 next hop: VM 1 (local))
prefix: 2.2.2.2 nexthop: VM 2 (local)
(--prefix: 2.2.2.2 next hop: VM 2 (local))
prefix: 1.1.1.1 nexthop: VM 3 (remote)
(--prefix: 1.1.1.1 next hop: VM 3 (remote))
prefix: 2.2.2.2 nexthop: VM 4 (remote)
(--prefix: 2.2.2.2 next hop: VM 4 (remote))

When the leaf switch 1 receives a packet forwarded by a DCGW or the leaf switch 2, the leaf switch 1 forwards the packet based on the first VRF table. It is ensured that a packet whose destination address is 1.1.1.1 is forwarded to the VM 1 and a packet whose destination address is 2.2.2.2 is forwarded to the VM 2, and a case that the leaf switch 1 forwards the packet to the leaf switch 2 again does not occur.

In addition, when the leaf switch receives a packet that is from the VM 1 and whose destination address is 2.2.2.2, because the packet does not carry tunnel attribute information, the leaf switch 1 forwards the packet based on the foregoing second VRF table. In other words, the leaf switch 1 may select, according to a load balancing policy, one route from two routes whose next hops are the VM 2 and the VM 4 as a route used to forward the packet, to implement load balancing and avoid a resource waste.

In other words, after the network device uses the packet forwarding method provided in the embodiments, a routing loop can be avoided. In addition, it can be ensured that a packet is forwarded according to the load balancing policy, and the resource waste is avoided.

Figure 9:
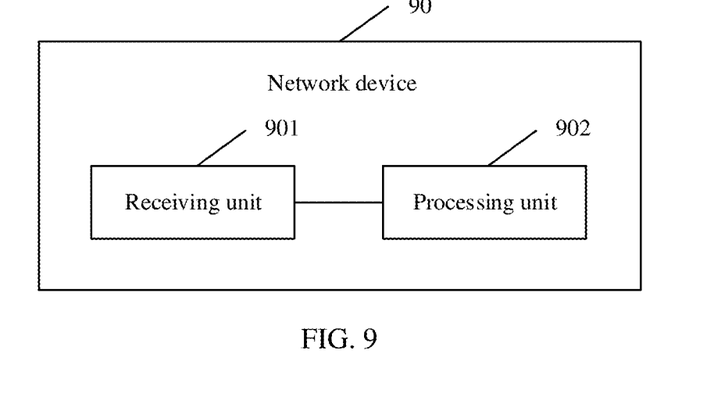
FIG. 9 is a schematic structural diagram of a network device according to an embodiment.

FIG. 9 is a schematic structural diagram of a network device according to an embodiment. A network device 90 provided in this embodiment may be, for example, the leaf switch 1 or the leaf switch 2 in the foregoing method embodiments. The network device 90 includes a first VRF table and a second VRF table. The network device further includes a receiving unit 901, configured to receive a first packet; and a processing unit 902, configured to: if the first packet carries tunnel attribute information, forward the first packet based on the first VRF table. The first VRF table includes one or more local routes, and next-hop outbound interfaces of the one or more local routes are all local outbound interfaces.

Optionally, in a possible implementation, the processing unit 902 is further configured to: generate the first VRF table based on a fact that an obtained route is a local route; determine a route whose next hop is a local outbound interface in the second VRF table; and generate the first VRF table based on the route whose next hop is the local outbound interface in the second VRF table.

Optionally, in a possible implementation, the processing unit 902 is further configured to: if the first packet does not carry the tunnel attribute information, forward the first packet based on the second VRF table. The second VRF table includes a plurality of routes, and the plurality of routes includes the one or more local routes and one or more routes whose next-hop outbound interfaces are remote outbound interfaces.

Optionally, in a possible implementation, the processing unit 902 is further configured to: determine, based on a destination address of the first packet, a first route used to forward the first packet in the first VRF table, where the first route belongs to the one or more local routes; and forward the first packet based on the first route.

Optionally, in a possible implementation, the receiving unit 901 is further configured to: receive a second packet, where the second packet includes the destination address; determine, based on the tunnel attribute information carried in the second packet and the destination address in the second packet, a second route used to forward the second packet in the first VRF table, where the second route belongs to the one or more local routes; and forward the second packet based on the second route.

Optionally, in a possible implementation, the tunnel attribute information is virtual extensible local area network VXLAN tunnel attribute information, multi-protocol label switching MPLS tunnel attribute information, or segment routing SR tunnel attribute information.

Optionally, in a possible implementation, the network device is a device connected to one or more virtual machines in a data center network.

Figure 10:
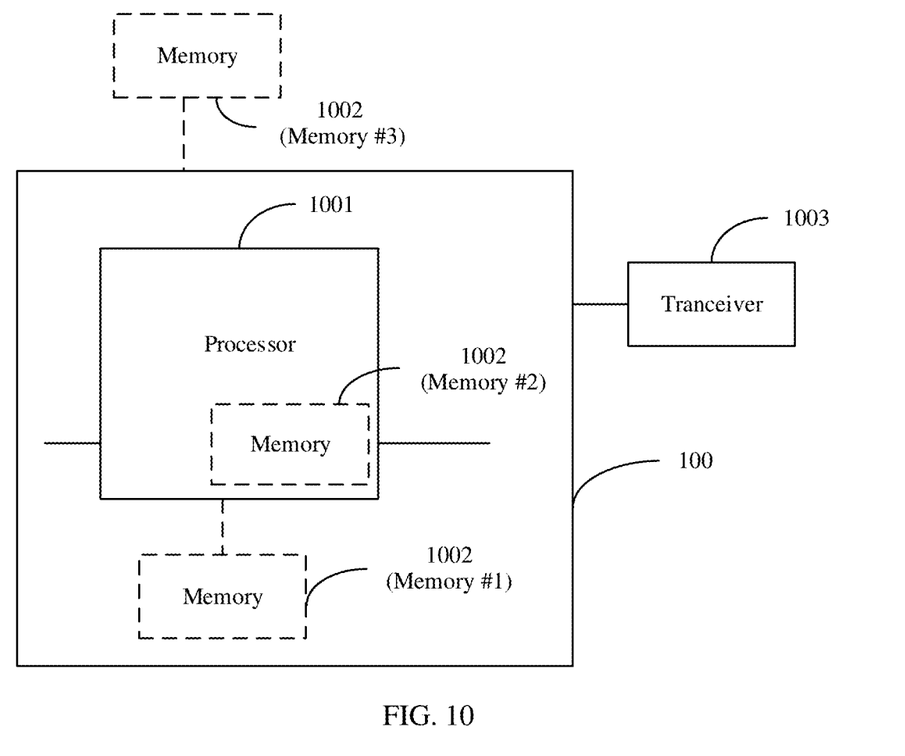
FIG. 10 is a schematic structural diagram of a network device according to an embodiment.

FIG. 10 is a schematic structural diagram of a network device according to an embodiment. As shown in FIG. 10, a network device 100 is provided. The network device 100 may be, for example, the network device in the foregoing method embodiments. The network device 100 includes a processor 1001. The processor 1001 is coupled to a memory 1002. The memory 1002 may be independent of the processor 1001 or independent of the network device 100, for example, a memory #3. The memory 1002 may alternatively be inside the processor 1001 or the network device 100 (a memory #1 and a memory #2). The memory 1002 may be a physically independent unit, or may be storage space, a network hard disk, or the like on a cloud server. Optionally, there may be one or more memories 1002. When there are a plurality of memories 1002, the plurality of memories 1002 may be located at a same location or different locations, and may be used independently or in cooperation.

The memory 1002 is configured to store a computer-readable instruction (or referred to as a computer program).

The processor 1001 is configured to read the computer-readable instruction to implement the method provided in any one of the foregoing aspects related to the network device and the implementations thereof.

Optionally, the network device 100 further includes a transceiver 1003, configured to receive and send data.

In addition, the processor 1001 may be a central processing unit, a general-purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in the embodiments. Alternatively, the processor may be a combination of processors implementing a computing function, for example, a combination of one or more microprocessors, or a combination of the digital signal processor and a microprocessor. In addition, the memory 1002 may include a volatile memory, for example, a random access memory (RAM). The memory may alternatively include a non-volatile memory, for example, a flash memory, a hard disk drive (HDD), a solid-state drive (SSD), cloud storage, network attached storage, or a network drive. The memory may further include a combination of the foregoing types of memories or another medium or product in any form that has a storage function.

It may be clearly understood by a person of ordinary skill in the art that, for the purpose of convenient and brief description, for a detailed working process of the foregoing system, apparatus, and unit, refer to a corresponding process in the foregoing method embodiments, and details are not described herein again.

In the several embodiments provided in the embodiments, it should be understood that the disclosed system, apparatus, and method may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments may be integrated into one processing unit, or each of the units may exist alone physically, or two or more units are integrated into one unit. The integrated unit may be implemented in a form of hardware or may be implemented in a form of a software functional unit.

When the integrated unit is implemented in the form of a software functional unit and sold or used as an independent product, the integrated unit may be stored in a computer-readable storage medium. Based on such an understanding, the solutions of the embodiments essentially, or the part contributing to the prior art, or all or some of the solutions may be implemented in the form of a software product. The computer software product is stored in a storage medium and includes several instructions for instructing a computer device (which may be a personal computer, a server, or a network device) to perform all or some of the steps of the methods described in the embodiments. The foregoing storage medium includes any medium that can store program code, for example, a USB flash drive, a ROM, a RAM, a magnetic disk, or an optical disc.

The invention claimed is:

1. A packet forwarding method applied to a network device, the method comprising:
   receiving a first packet with tunnel attribute information; and
   forwarding the first packet based on a first virtual routing forwarding (VRF) table, wherein the first VRF table consists of one or more local routes, and each next-hop outbound interface of the one or more local routes is a local outbound interface,
   wherein the first VRF table includes only the local routes to prevent the first packet from being forwarded to another tunnel endpoint device,
   receiving a second packet without tunnel attribute information; and
   forwarding the second packet based on a second VRF table to balance resource usage of packet forwarding, wherein the second VRF table comprises a plurality of routes, and the plurality of routes comprises the one or more local routes and at least one route whose next-hop outbound interface is a remote outbound interface.

2. The method according to claim 1, wherein before receiving the first packet, the method comprises:
   generating the first VRF table based on a fact that an obtained route is a local route.

3. The method according to claim 1, wherein the tunnel attribute information is virtual extensible local area network (VXLAN) tunnel attribute information, multi-protocol label switching, (MPLS) tunnel attribute information, or segment routing (SR) tunnel attribute information.

4. The method according to claim 1, wherein the network device is a device connected to a plurality of virtual machines in a data center network.

5. A network device, comprising:
   a memory, comprising instructions;
   a processor coupled to the memory, the instructions, when executed by the processor, cause the network device to:
   to receive a first packet with tunnel attribute information; and
   forward the first packet based on a first virtual routing forwarding (VRF) table, wherein the first VRF table consists of one or more local routes, and each next-hop outbound interface of the one or more local routes is a local outbound interface,
   wherein the first VRF table includes only the local routes to prevent the first packet from being forwarded to another tunnel endpoint device,
   receiving a second packet without tunnel attribute information; and
   forwarding the second packet based on a second VRF table to balance resource usage of packet forwarding, wherein the second VRF table comprises a plurality of routes, and the plurality of routes comprises the one or more local routes and at least one route whose next-hop outbound interface is a remote outbound interface.

6. The network device according to claim 5, wherein the instructions further cause the network device to:
   generate the first VRF table based on an obtained route being a local route.

7. The network device according to claim 5, wherein the instructions further cause the network device to:
   determine, based on a destination address of the first packet, a first route used to forward the first packet in the first VRF table, wherein the first route belongs to the one or more local routes; and
   forward the first packet based on the first route.

8. The network device according to claim 5, wherein the tunnel attribute information is virtual extensible local area network (VXLAN) tunnel attribute information, multi-protocol label switching (MPLS) tunnel attribute information, or segment routing (SR) tunnel attribute information.

9. The network device according to claim 5, wherein the network device is a device connected to one or more virtual machines in a data center network.

10. A non-transitory computer-readable storage medium, wherein the computer-readable storage medium stores a computer-readable instruction which, when executed by a processor, implement a method comprising:
    receiving a first packet with tunnel attribute information; and
    forwarding the first packet based on a first virtual routing and forwarding (VRF) table, wherein the first VRF table consists of one or more local routes, and each next-hop outbound interface of the one or more local routes is a local outbound interface,
    wherein the first VRF table includes only the local routes to prevent the first packet from being forwarded to another tunnel endpoint device,
    receiving a second packet without tunnel attribute information; and
    forwarding the second packet based on a second VRF table to balance resource usage of packet forwarding, wherein the second VRF table comprises a plurality of routes, and the plurality of routes comprises the one or more local routes and at least one route whose next-hop outbound interface is a remote outbound interface.

11. The non-transitory computer-readable storage medium according to claim 10, wherein the method further comprises:
    generating the first VRF table when an obtained route is a local route.

12. The non-transitory computer-readable storage medium according to claim 10, wherein the tunnel attribute information is virtual extensible local area network (VXLAN) tunnel attribute information.

13. The non-transitory computer-readable storage medium according to claim 10, wherein the tunnel attribute information is multi-protocol label switching (MPLS) tunnel attribute information or segment routing (SR) tunnel attribute information.

14. The non-transitory computer-readable storage medium according to claim 10, wherein the network device is a device connected to a plurality of virtual machines in a data center network.

* * * * *